United States Patent
Ferenz et al.

(10) Patent No.: US 7,598,334 B2
(45) Date of Patent: Oct. 6, 2009

(54) PROCESS FOR PREPARING EQUILIBRATION PRODUCTS OF ORGANOSILOXANES, THE ORGANOPOLYSILOXANES THUS OBTAINABLE, AND USE THEREOF

(75) Inventors: Michael Ferenz, Essen (DE); Sascha Herrwerth, Essen (DE); Wilfried Knott, Essen (DE)

(73) Assignee: Goldschmidt GmbH, Essen (DE)

( * ) Notice: Subject to any disclaimer, the term of this patent is extended or adjusted under 35 U.S.C. 154(b) by 308 days.

(21) Appl. No.: 11/327,235

(22) Filed: Jan. 6, 2006

(65) Prior Publication Data
US 2006/0155089 A1      Jul. 13, 2006

(30) Foreign Application Priority Data
Jan. 7, 2005     (DE)     ........................ 10 2005 001 039

(51) Int. Cl.
*C08G 77/06*     (2006.01)

(52) U.S. Cl. ........................................................ 528/23
(58) Field of Classification Search ....................... None
See application file for complete search history.

(56) References Cited

U.S. PATENT DOCUMENTS

| | | | | |
|---|---|---|---|---|
| 3,694,405 | A * | 9/1972 | Litteral ......................... | 528/23 |
| 7,196,153 | B2 * | 3/2007 | Burkhart et al. ............... | 528/23 |
| 2004/0176561 | A1 * | 9/2004 | Janeiro ......................... | 528/12 |

FOREIGN PATENT DOCUMENTS

| | | |
|---|---|---|
| DE | 2152270 | 4/1972 |
| DE | 103 59 764 A1 | 7/2005 |
| EP | 1 439 200 A1 | 7/2004 |

* cited by examiner

*Primary Examiner*—Marc S Zimmer
(74) *Attorney, Agent, or Firm*—Frommer Lawrence & Haug LLP

(57) ABSTRACT

The invention relates to a process for preparing equilibration products of organosiloxanes by rearrangement of the siloxane bond over a cation exchange resin, to the organopolysiloxanes thus obtainable, and to their use.

12 Claims, No Drawings

PROCESS FOR PREPARING EQUILIBRATION PRODUCTS OF ORGANOSILOXANES, THE ORGANOPOLYSILOXANES THUS OBTAINABLE, AND USE THEREOF

The invention relates to a process for preparing equilibration products of organosiloxanes by rearranging the siloxane bond over a cation exchange resin, to the organopolysiloxanes thus obtainable, and to their use for producing adhesive coatings.

Any foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. Citation or identification of any document in this application is not an admission that such document is available as prior art to the present invention.

The surfactant activity of organofunctionalized siloxanes is determined, as well as by the molecular weight, degree of functionalization, and substituents attached directly to the siloxane backbone, primarily by the degree of statistical uniformity achieved in the functional siloxane. This finding holds in particular for comblike organosiloxanes, which originate, for example, from equilibration reactions of dimethylcyclosiloxanes, poly(methylhydro)siloxanes or else cyclo(methylhydro)siloxanes, and hexamethyldisiloxanes.

Where the identified hydrosiloxane equilibrates are used as starting materials for further molecular enlargement reactions, especially polyether-bearing siloxanes as surfactants (e.g., as foam stabilizers in PU applications), the quality of the particular equilibrate employed is often apparent simply from visual comparison between the adducts prepared from it. Polyethersiloxanes having a pronounced block character—that is, having locally increased functionalization densities along the siloxane structure—are opaquely turbid products, while uniformly functionalized derivatives have an optically uniform clarity. In the case of hydrocarbon side chains this effect is less pronounced.

Even more striking is the direct comparison of the performance properties of these block and random organosiloxane copolymers, respectively, in the various fields of industrial application.

In a hot flexible foam system, which represents a sensitive indicator, established, standard formulas provide good foaming outcomes only when randomly functionalized polyethersiloxanes are used as foam stabilizers, whereas in other applications, such as abhesive coatings, for example, terminally functionalized siloxanes provide the lower release values.

There has therefore been no lack of attempts to provide catalysts allowing the preparation, to a high degree, of hydrosiloxane equilibrates as starting materials for further molecular enlargement reactions, with the desired degree of statistical uniformity of the SiH segments.

From the standpoint of industrial preparation, ion exchange resins possess the advantage of allowing easy, mechanical separation of the acidic catalyst from the equilibrate and of requiring no neutralizing aftertreatment of the hydrosiloxane.

Equilibrations of siloxanes over ion exchange resins are therefore state of the art. Among the multiplicity of known systems, the Amberlyst ion exchanger (especially Amberlyst® 15) is one frequently utilized catalytic phase.

For instance, DE-A-21 52 270, incorporated into the present invention in its entirety by reference, describes a process for preparing equilibration products of organosiloxanes by rearrangement of the siloxane bond over a cation exchange resin, organosiloxane or an organosiloxane mixture employed as starting material being caused to flow at a temperature of about 10° C. to about 100° C. through a packing comprising as cation exchange resin a macrocrosslinked cation exchange resin which contains sulfonic acid groups and has an average pore volume of at least approximately 0.01 $cm^3$, and the eluted organosiloxanes being isolated.

As well as the preparation of nonfunctional polydimethylsiloxanes, a description is given therein of the possibility of preparing copolymeric dimethylsiloxane-poly(methyl)hydrosiloxanes by equilibrating a mixture composed of methylhydropolysiloxane, hexamethyldisiloxane, and cyclic siloxanes over the macrocrosslinked ion exchange phase Amberlyst® 15.

The reaction products thus obtained contain, separated by the predominant individual SiH functions, SiH functions which are arranged in clusters and distributed irregularly over the entire siloxane chain.

EP-A-1 439 200 describes a process for preparing equilibration products of organopolysiloxanes by rearrangement of the siloxane bond over a sulfonic-acid cation exchange resin, which comprises using a cation exchange resin for which the product P of its specific surface area and its average pore diameter is $P \geq 2.2 \times 10^{-3}$ $m^3/kg$ and the specific surface area A is $\geq 35$ $m^2/g$.

The evaluation of nuclear magnetic resonance spectra permits the conclusion that the reaction products thus obtained contain predominantly individual SiH segments in statistical arrangement. They are outstandingly suitable as starting materials for further molecular enlargement reactions for preparing foam stabilizers for flexible polyurethane foams.

They are, however, less suitable as starting materials for producing abhesive coatings.

Surprisingly it has been found that specific sulfonic-acid cation exchange resins allow the appropriately rapid setting of a suitable equilibration equilibrium without producing a random distribution of the SiH functions in the hydrosiloxane recovered.

The invention accordingly provides first a process for preparing organosiloxane equilibration products containing SiH groups by rearrangement of the siloxane bond over a sulfonic-acid cation exchange resin, an organosiloxane or organosiloxane mixture utilized as starting material with hydrosiloxanes being contacted at a temperature of 10° C. to 120° C. with a macrocrosslinked cation exchange resin containing sulfonic acid groups, and the equilibrated organosiloxanes obtained being isolated, which comprises using a cation exchange resin for which the product P of its specific surface area and its average pore diameter is $P < 2.2 \times 10^{-3}$ $m^3/kg$, in particular $<1.5 \times 10^{-3}$ $m^3/kg$, more preferably $<1 \times 10^{-3}$ $m^3/kg$, and the specific surface area A is $<50$ m 2/g, in particular $A < 35$ $m^2/g$, and more preferably $A < 25$ $m^2/g$.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Key parameters to describe the catalyst phases for use in accordance with the invention are the specific surface area and the average pore diameter. Where a product is formed from the two variables, said product has the character of an inverse density (volume:mass) and allows a clear differentiation between functional ion exchangers and ion exchangers that cannot be used in accordance with the invention.

The inventively preferred range for the average pore diameter is between 20 to 100 nm, preferably between 30 to 80 nm.

Considered in relation to the ion exchanger Purolite® C 150 MBH, used with preference in accordance with the invention, this appears as follows:

$$22 \text{ m}^2/\text{g} \times 35 \text{ nm} = 770 \text{ m}^2 \text{ nm/g} = 0.77 \times 10^{-3} \text{ m}^3/\text{kg}.$$

The analytical results are not in contradiction with the assumption that the equilibration products, unlike the catalysts used to date, have SiH functions which are not distributed randomly within the chain but instead to a high degree are present in the form of domains (clusters) predominantly alongside one another.

This finding was not calculable by the skilled worker, since, as macroporous sulfonated polystyrenes, these polymeric resins possess exactly the same chemical base structure as Amberlyst® 15 or Lewatit K 2621 (EP-A-1 439 200), but each generate equilibration products which are entirely different.

The invention therefore further provides the organopolysiloxanes obtained by said process.

The organopolysiloxanes obtained by said process are excellent starting materials for the production of industrial products such as, for example, defoamers in aqueous and water-free applications/industrial operations, dispersants for inks, paints, and coatings, for producing radiation-curing printing inks, paints and coatings; and, in particular, subsequent reaction with (meth)acrylated alcohols in the presence of a catalyst, with the formation of SiOC bonds, produces compounds which are outstandingly suitable for producing abhesive coatings.

This is all the more surprising in view of the fact that it has proven in practice to be the case that abhesive coatings, especially those produced with terminally modified organopolysiloxanes, are distinguished on flat substrates by low release values which are stable over time, since such polysiloxanes possess a high silicone character which is not disrupted by organic modification within the siloxane chain.

The invention accordingly further provides organopolysiloxanes which contain (meth)acrylate groups and are obtained by reacting (meth)acrylated alcohols with SiH-functional organosiloxanes prepared by the above process.

According to one industrial process, that of DE-A-103 59 764, unpublished at the priority date of the present specification, a technically simple process is disclosed which allows terminal and/or pendant, (meth)acrylate-modified, radiation-curable polysiloxanes to be prepared via SiOC chemistry without disassembly of the parent siloxane framework.

Using a Lewis acid catalyst, with or without the use of a synergistic co-catalyst such as salts or complexes with cations selected from the group of elements of transitions groups 4, 6, 7 and 8 and also of main group 4, in accordance with DE-A-10 2004 039 911, or with DE-A-103 12 634, unpublished at the priority date of the present specification, of a mixture of a carboxylic acid and the salt of a carboxylic acid, it is possible to carry out selective coupling of (meth)acrylate-containing alcohols with terminal and/or pendant SiH-siloxanes without observing disassembly of the siloxane framework. Furthermore, there are no hydrosilylation reactions of the (meth) acrylate groups on SiH groups, accompanied by SiC linkage. With a view to the present invention, reference is made to said patents in their entirety.

A disadvantage associated with these coatings, however, is their sometimes inadequate adhesion to the substrates used, which consist of papers or films.

Adhesive coating compositions are used, for example, to coat papers or films which are intended to serve as backings for self-adhesive labels. Provided with a pressure-sensitive adhesive, the labels still adhere to the coated surface sufficiently to allow the backing films plus adhesive labels to be handled.

The adhesion of the adhesive labels to the backing films must be sufficiently high that during the machine application of labels, to containers for example, the labels do not separate prematurely from their backing films as they run over deflection rolls.

On the other hand, however, the labels must be able to be peeled from the coated backing film without any substantial impairment to their bond strength for subsequent use. This requires particularly effective curing of the silicone release layer, since otherwise silicone components may transfer to the surface of the adhesive and reduce the bond strength. It was a further object of the present invention, therefore, to provide (meth)acrylate-modified organosiloxanes for the production of abhesive coatings that are distinguished not only by low release values (abhesive property), stable over time, but also by improved substrate adhesion (adhesive property) and which, furthermore, exhibit improved surface properties.

Surprisingly it has been found that these requirements are met by the siloxanes of the invention prepared in the first stage and containing SiH clusters, in which subsequently, in a second stage, some or all of the SiH groups are reacted in the presence of suitable catalysts with alcohols by one of the processes of DE-A-103 59 764, DE-A-10 2004 039 911 or DE-A-103 12 634. As well as good release properties and improved adhesive properties, these coatings possess enhanced scratch resistance and gliding properties.

One preferred embodiment of the process for preparing the SiH-functional siloxanes comprises subjecting low molecular mass organopolysiloxanes, especially linear polyorganosiloxanes, and hydrosiloxanes, preferably siloxanes and H-siloxanes, which contain 3 to 200 Si atoms to depolymerization and equilibration. In particular an organosiloxane is isolated which is in an equilibrium of the chemical compounds (equilibrate) and whose viscosity is up to about 10,000 cP. In another embodiment of the invention, the viscosity is between about 100 to about 5,000 cP. In yet another embodiment of the invention, the viscosity is between about 200 to about 1,000 cP.

The rearrangement is carried out preferably at a temperature of about 35° C. to about 100° C.

In accordance with the invention, in a further embodiment, the process is carried out continuously; from the eluting organosiloxane mixture, a fraction having the desired boiling range is separated off, and the fraction having the unwanted boiling range is recycled to the feed comprising organosiloxanes.

The alcohols used in the second stage in accordance with the invention are compounds selected from the group of singly or multiply (meth)acrylated monoalcohols or polyalcohols, or from a mixture thereof, or from mixtures of the singly or multiply (meth)acrylated monoalcohols or polyalcohols with any desired other alcohols, selected from the group of linear or branched, saturated, monounsaturated or polyunsaturated, aromatic, aliphatic-aromatic monoalcohols or polyalcohols, polyether monoalcohols, polyether polyalcohols, polyester monoalcohols, polyester polyalcohols, amino alcohols, especially N-alkyl-, arylamino-EO—, —PO-alcohols, N-alkyl- or arylamino alcohols and mixtures thereof, in the presence of a suitable catalyst which replaces some or all of the SiH groups of the polysiloxane by alkoxide residues of the alcohols employed.

Preferred active Lewis acid catalysts for the purposes of the present invention are the Lewis acid compounds of elements from main group III, especially boron and/or aluminum compounds, such as, with particular preference, tris(pentafluorophenyl)borane, alone or in combination with synergistic co-catalysts such as salts or complexes, with cations selected from the group of elements from transition groups 4, 6, 7, and 8 and also from main group 4, examples being the cations of the elements titanium, zirconium, chromium, manganese, iron, nickel, palladium, and tin, with anions preferably from the group of alkoxylates, acid anions, especially carboxylates, sulfates, nitrates or phosphates, halides, especially chlorides, oxides or complex ligands, especially acetylacetonate or carbonyls.

The invention will now be further described by way of the following non-limiting examples.

EXAMPLES

Preparation of the Sulfonic-Acid Ion Exchange Resins Used in the Inventive Example Purolite® C 150 MBH in an open evaporating boat was placed for a period of 18 hours in a drying cabinet heated at 60° C. and then, while still hot, was transferred in the absence of moisture to vessels which had been rendered inert, in which it was stored.

Example 1a

Preparation of a Hydrosiloxane

Inventive Example

A mixture consisting of 732 g of decamethylcyclopentasiloxane (D$_5$), 97 g of poly(methyl)hydrosiloxane PTF1 (SiH content: 15.75 eq/kg) and 73 g of HSiMe$_2$—[SiMe$_2$O]$_8$—SiMe$_2$H was admixed with 3% by mass of predried ion exchange resin Purolite® C 150 MBH, followed by equilibration at 95° C. for 6 hours with continuous stirring. After the reaction mixture had cooled down the ion exchange resin was separated off by filtration.

By $^{29}$Si NMR spectroscopy the inventively recovered hydrosiloxane was assigned an average structure which may be reproduced by the following formula:

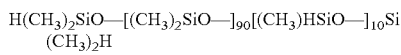

Preparation of a Hydrosiloxane

Inventive Example

A mixture consisting of 592 g of decamethylcyclopentasiloxane (D$_5$), 48 g of poly(methyl)hydrosiloxane PTF1 (SiH content: 15.75 eq/kg) and 36 g of HSiMe$_2$—[SiMe$_2$O]$_8$—SiMe$_2$H was admixed with 3% by mass of predried ion exchange resin Purolite® C 150 MBH, followed by equilibration at 95° C. for 6 hours with continuous stirring. After the reaction mixture had cooled down the ion exchange resin was separated off by filtration.

By $^{29}$Si NMR spectroscopy the inventively recovered hydrosiloxane was assigned an average structure which may be reproduced by the following formula:

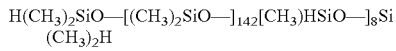

Comparative Example 1

Preparation of a Hydrosiloxane

A mixture consisting of 732 g of decamethylcyclopentasiloxane (D$_5$), 97 g of poly(methyl)hydrosiloxane PTF1 (SiH content: 15.75 eq/kg) and 73 g of HSiMe$_2$—[SiMe$_2$O]$_8$—SiMe$_2$H was admixed with 0.1% of trifluoromethanesulfonic acid, followed by equilibration at 30° C. for 6 hours with continuous stirring. The equilibrate was subsequently neutralized with Na$_2$CO$_3$.

By $^{29}$Si NMR spectroscopy the thus-recovered hydrosiloxane was assigned the following average structure:

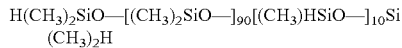

Example 2a

Further Processing of the Hydrosiloxane Recovered in Example 1a to Give a Polysiloxane-Polyoxyalkylene Block Copolymer 43 g of hydroxyethyl acrylate (HEA) and 140 mg of methylhydroquinone were dissolved in 40 ml of toluene and the solution was heated to 100° C. Then 180 mg of B(C$_6$F$_5$)$_3$ were added and the 220 g of the SiH siloxane from example 1 were added dropwise over the course of 2 h. Stirring was carried out at 120° C. for 2 h and then the volatile constituents were removed under a high vacuum.

Example 2b

Further Processing of the Hydrosiloxane Recovered in Example 1a to give a Polysiloxane-Polyoxyalkylene Block Copolymer 11 g of hydroxyethyl acrylate (HEA) and 70 mg of methylhydroquinone were dissolved in 20 ml of toluene and the solution was heated to 100° C. Then 180 mg of B(C$_6$F$_5$)$_3$ were added and the 110 g of the SiH siloxane from example 1a were added dropwise over the course of 2 h. Stirring was carried out at 120° C. for 2 h and then the volatile constituents were removed under a high vacuum.

Comparative Example 2

Further Processing of the Hydrosiloxane Recovered in Comparative Example 1 to Give a Polysiloxane-Polyoxyalkylene Block Copolymer 43 g of hydroxyethyl acrylate (HEA) and 140 mg of methylhydroquinone were dissolved in 40 ml of toluene and the solution was heated to 100° C. Then 180 mg of B(C$_6$F$_5$)$_3$ were added and the 220 g of the SiH siloxane from comparative example 1 were added dropwise over the course of 2 h. Stirring was carried out at 120° C. for 2 h and then the volatile constituents were removed under a high vacuum.

Performance Testing:

To test the performance properties of the curable examples and mixtures of the examples they are applied, following the addition of 2% of the photoinitiator Darocur 1173 from Ciba Specialty, to sheet-like (sheet-shaped) supports (oriented polypropylene film) and are cured by exposure to UV light from a state of the art medium-pressure mercury vapor lamp having a UV output of 50 W/cm under nitrogen inertization with a controlled residual oxygen content of <50 ppm and at a belt speed of 20 m/min. The application rate in each case is approximately 1 g/m².

Release Force:

The release forces are determined using a 25 mm wide adhesive tape which has been coated with a rubber adhesive and is available commercially from Beiersdorf as Tesa® 7476.

To measure the adhesiveness these adhesive tapes are rolled onto the substrate and then stored at 40° C. under a weight of 70 g/cm². After 24 hours a measurement is made of the force required to remove the respective adhesive tape from the substrate at a speed of 30 cm/min and a peel angle of 180°. This force is termed the release force. The general test procedure corresponds essentially to test method no. 10 of the Fédération internationale des fabricants et transformateurs d'adhésifs et thermocollants sur papier et autres supports (FINAT).

Loop Test:

The loop test serves for rapid determination of the degree of cure of a release coating. For this test a strip of the adhesive tape TESA® 4154 from Beiersdorf approximately 20 cm long is rolled three times onto the substrate and immediately removed again by hand. Then, by placing the ends of the adhesive tape together, a loop is formed, so that the adhesive faces of both ends are in contact over a distance of approximately one centimeter. The ends are then pulled apart again by hand, in the case of which the contact area ought to migrate uniformly to the center of the adhesive tape. In the event of contamination with poorly cured release material, the bond strength of the adhesive tape is no longer sufficient to hold the contact area together when the ends are pulled apart. In that case the test is classed as failed.

Subsequent Adhesion:

The subsequent adhesion is determined very largely in accordance with FINAT test specification no. 11. For this purpose the adhesive tape TESA® 7475 from Beiersdorf is rolled onto the substrate and then stored at 40° C. under a weight of 70 g/cm². After 24 hours the adhesive tape is separated from the release substrate and rolled onto a defined substrate (steel plate, glass plate, film). After one minute a measurement is made of the force required to remove the adhesive tape from the substrate at a speed of 30 cm/min and a peel angle of 180°. The resulting measurement is divided by the value for an untreated adhesive tape under otherwise identical test conditions. The result is termed the subsequent adhesion and is generally expressed as a percentage. Figures above 80% are considered by the skilled worker to be sufficient, and suggest effective curing.

Rub-Off:

The rub-off test serves for rapid determination of the adhesion of the coating to the substrate. For this purpose a single site on the coating is rubbed with the finger in 10 small circular motions, at constant pressure. The rub-off test is carried out only on coatings which have cured effectively. It is passed if no silicone constituents can be rubbed off.

| | Performance characteristics | | | |
|---|---|---|---|---|
| | Release force Tesa 7476 [cN/inch] | LOOP test passed yes/no | Subsequent adhesion [%] | Rub-off passed yes/no |
| Example 2a | 48 | yes | 98 | yes |
| Example 2b | 35 | yes | 95 | yes |
| Comparative example 2 | 74 | yes | 96 | yes |

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A process for preparing SiH-functional organosiloxane equilibration products by rearrangement of the siloxane bond over a sulfonic-acid cation exchange resin, an organosiloxane or organosiloxane mixture utilized as starting material being contacted at a temperature of 10° C. to 120° C. with a macrocrosslinked cation exchange resin containing sulfonic acid groups, and the equilibrated organosiloxanes obtained being isolated, which comprises using a cation exchange resin for which the product P of its specific surface area and its average pore diameter is $P<2.2\times10^{-3}$ m³/kg and the specific surface area A is <35 m²/g.

2. The process as claimed in claim 1, wherein low molecular mass organopolysiloxanes are subjected to depolymerization.

3. The process as claimed in claim 1, wherein low molecular mass organopolysiloxanes are subjected to equilibration.

4. The process as claimed in claim 1, wherein an aliphatic hydrocarbon is used as solvent.

5. The process as claimed in claim 1, 2, 3, or 4, wherein an organopolysiloxane is isolated in which the chemical compounds are at equilibrium.

6. The process as claimed in claim 1, wherein the SiH-functional siloxanes are prepared using a cation exchange resin whose average pore diameter is in the range from 20 to 100 nm.

7. The process as claimed in claim 1, wherein the rearrangement is carried out at a temperature of about 30 to about 100° C.

8. The process as claimed in claim 1, wherein organosiloxanes whose viscosity is up to about 10,000 cP are used as starting material.

9. The process as claimed in claim 1, wherein a cation exchange resin is used whose average specific surface area is about 20 to 50 m²/g.

10. The process as claimed in claim 1, which is carried out continuously, from the organosiloxane mixture obtained a fraction having the desired boiling range is separated off, and the fraction having the unwanted boiling range is recycled to the feed comprising organosiloxanes.

11. The process as claimed in claim 1, wherein a mixture of hexamethyldisiloxane, poly(methyl)hydrosiloxane, and cyclic siloxanes is used as starting material.

12. The process of claim 1, wherein the product P of its specific surface area and its average pore diameter is $P<1.0\times 10^{-3}$ m$^3$/kg and the specific surface area A is <25 m$^2$/g, the organosiloxanes whose viscosity is up to about 10,000 cP are used as starting material, wherein the process is carried out continuously, from the organosiloxane mixture obtained a fraction having the desired boiling range is separated off, and the fraction having the unwanted boiling range is recycled to the feed comprising organosiloxanes.

* * * * *

UNITED STATES PATENT AND TRADEMARK OFFICE
CERTIFICATE OF CORRECTION

PATENT NO. : 7,598,334 B2  Page 1 of 1
APPLICATION NO. : 11/327235
DATED : October 6, 2009
INVENTOR(S) : Ferenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Twenty-eighth Day of September, 2010

David J. Kappos
*Director of the United States Patent and Trademark Office*